(12) United States Patent
Schwetz et al.

(10) Patent No.: US 6,531,423 B1
(45) Date of Patent: Mar. 11, 2003

(54) LIQUID-PHASE-SINTERED SIC SHAPED BODIES WITH IMPROVED FRACTURE TOUGHNESS AND A HIGH ELECTRIC RESISTANCE

(75) Inventors: Karl-Alexander Schwetz, Sulzberg (DE); Lorenz Sigl, Lechaschau (AT); Thomas Kempf, Kempten (DE); Georg Victor, Kempten (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/612,168

(22) Filed: Jul. 8, 2000

(30) Foreign Application Priority Data

Jul. 15, 1999 (DE) .......................................... 199 33 194

(51) Int. Cl.⁷ ...................... C04B 35/565; C04B 35/577
(52) U.S. Cl. ............................... 501/89; 501/90; 501/92
(58) Field of Search .............................. 501/89, 90, 92; 89/36.02

(56) References Cited

U.S. PATENT DOCUMENTS

| | | | |
|---|---|---|---|
| 4,502,983 A | | 3/1985 | Omori et al. |
| 4,564,490 A | | 1/1986 | Omori et al. |
| 4,569,922 A | | 2/1986 | Suzuki |
| 4,829,027 A | | 5/1989 | Cutler et al. |
| 5,298,470 A | | 3/1994 | Chia et al. |
| 5,407,750 A | * | 4/1995 | Kinoshita et al. .............. 501/89 |
| 5,591,685 A | * | 1/1997 | Mitomo et al. ................ 501/88 |
| 5,656,218 A | | 8/1997 | Lin et al. |

FOREIGN PATENT DOCUMENTS

| | | |
|---|---|---|
| CA | 1 256 459 | 6/1989 |
| DE | 33 44 263 | 1/1991 |
| DE | 197 30 770 | 2/1998 |
| EP | 0 251 218 | 1/1988 |
| EP | 0 419 271 | 3/1991 |
| JP | 59-51384 | 3/1984 |
| WO | 97 03030 | 1/1997 |

OTHER PUBLICATIONS

I. Wiedmann, et al.: Liquid–Phase Sintering of Silicone Carbide, Werkstoffwoche 1996, Symposium 7: Materialwissenschaftliche Grundlagen, F. Aldinger & Mughrabi, DGM Informationsgesellschaft Verlag, Oberursel (1997) 515–520 (and English summary).

T. Grande, et al.: Effect of Weight Loss on Liquid–Phase–Sintered Silicon Carbide in J. Am. Geram. Soc. 80, No. 4, 1047–1057, 1997.

K.A. Schwetz, et al.: "Mechanical Properties of Injection Molded $B_4C$–C Ceramics" Journal of Solid State Chemistry 133, 68–76, 1997.

M. Nader, Thesis: "INAM" University Stuttgart (1995) (and English Summary).

* cited by examiner

*Primary Examiner*—Karl Group
(74) *Attorney, Agent, or Firm*—Collard & Roe, P.C.

(57) ABSTRACT

The invention relates to a polycrystalline SiC shaped body, which consists of 96% by weight to 99.5% by weight of hard-material grains having a core/shell structure, 0 to 0.1% by weight free carbon, remainder a partially crystalline binder phase; having the following properties: density at least 99.5% of the theoretical density, dark green coloring of ground sections or polished surfaces through characteristic light absorption in the orange spectral region at 1.8 to 2.2 eV, resistivity of at least $10^7$ ohm·cm, and fracture toughness of at least 4.0 $MPa.m^{1/2}$, measured using the bridge method.

7 Claims, 2 Drawing Sheets

Optical absorption spectra of green SiC shaped bodies according to the invention ("EKasic T green" = Example 3) and black, commercially available LPS-SiC sintered bodies ("EKasic T black" = Comparative Example 12C).

2 μm

Microstructure of the SiC shaped body produced in Example 3

GRAY to BLACK: SiC hard-material grains with core-shell structure
(core: SiC; shell: Si-C-Al-O-N mixed crystal)

WHITE: Binder phase
(binder phase content: 2.8% by mass)

LIQUID-PHASE-SINTERED SIC SHAPED BODIES WITH IMPROVED FRACTURE TOUGHNESS AND A HIGH ELECTRIC RESISTANCE

FIELD OF THE INVENTION

The invention relates to liquid-phase-sintered SiC shaped bodies with improved fracture toughness and a high electrical resistance, and to methods for producing same.

BACKGROUND OF THE INVENTION

Dense sintered SiC is distinguished by a combination of valuable properties, such as high hardness and wear resistance, ability to withstand high temperatures, high thermal conductivity, resistance to thermal shocks, and resistance to oxidation and corrosion. Due to these properties, the solid-state sintered SiC has nowadays become accepted as a virtually ideal material for sliding-contact bearings and axial face seals which are subject to wear in the chemical apparatus and mechanical engineering sectors. Alpha- or beta-SiC sintering powder with particle sizes in the submicron range (mean grain size <1 $\mu$m) and a simultaneous addition of up to 2% carbon and boron have been recognized as prerequisites for the pressureless sintering. As an alternative to boron or boron compounds, it is also possible to use aluminum and aluminum compounds or beryllium and beryllium compounds, the net result being the same. During the sintering, an SiC polytype transformation and grain growth take place, the extent of which processes are dependent on the nature and quantity of the sintering additives and the sintering temperature. Boron-doped beta-SiC powders tend toward secondary recrystallization (exaggerated grain growth), while starting from alpha-SiC powder with boron or aluminum doping results in a fine-grained globular or bimodal microstructure, comprising a fine matrix with plateletlike crystals showing a high aspect ratio. Generally, the solid-state sintered SIC bodies have a transcrystalline fracture mode and, at a relative density of 95–98% of the theoretical density (% TD), reach a room-temperature strength of up to 450 MPa, which is retained even at elevated temperatures of up to 1500° C. However, the brittleness of this SiC ceramic represents an obstacle preventing any broader expansion of its use in industry. Owing to the high fraction of covalent bonding, SiC is extremely brittle, and even small flaws in the microstructure of the material may lead to sudden failure of a component.

Therefore, it is necessary to develop Sic ceramics with an improved fracture behavior and to meet the requirements imposed on the reliability of the components.

Nowadays, dense sintered Sic with an intercrystalline fracture mode, improved fracture toughness and room temperature strength can be produced in a similar manner to silicon nitride ($Si_3N_4$)using a liquid phase sintering process. The addition of suitable metal oxides or nitrides which form low-melting eutectics with SiC and the adhering $SiO_2$ results, during the sintering operation, in the formation of a liquid phase which makes a decisive contribution to the densification of the ceramic. The recommended sintering additives are mainly mixtures of $Al_2O_3$ and $Y_2O_3$ (M. Omori et al.: U.S. Pat. No. 4,502,983 (1985) and U.S. Pat. No. 4,564,490 (1986), and R. A. Cutler et al.: U.S. Pat. No. 4,829,027 (1988)),but also $Y_2O_3$ or other sesquioxides of the rare earth metals ($RE_2O_3$) in combination with aluminum nitride (AlN) (K. Y. Chia etal.: U.S. Pat. No. 5,298,470 (1994), M. Nader, Dissertation: INAM, University of Stutgart (1995), I. Wiedmann et al.:"Flüssigphasensintern von Siliciumcarbid" [Liquid-phase sintering of silicon carbide], in: Werkstoffwoche 1996, Symposium 7: Materialwiss. Grundlagen, Ed. F. Aldinger and H. Mughrabi, DGM Informationsgesellschaft, Oberursel (1997), 151–520, H. K ölker et al.: DE 19730770 (1998)). The liquid-phase sintering may be carried out without pressure, i.e. under atmospheric pressure, if appropriate using a powder bed, or by employing the gas pressure sintering technique under elevated gas pressure without an embedding material. A liquid-phase 35 sintered SiC (LPSSiC) which has been introduced into the market by Wacker-Chemie GmbH under the brand name EKasic T exhibits a virtually pore-free, fine grained microstructure (mean SiC grain size approx. 1 $\mu$m), a flexural strength of approx. 600 MPa, a fracture toughness which is 40 to 60% higher than that of solid state sintered SiC (SSiC) and a higher electrical insulating capacity (cf. Table 1).

TABLE 1

Comparison of properties of SSiC and LPSSiC

| SiC material variant | Sintering mecha- nism | Sintering additive contents % by weight | Color (polished surface) | Resis- tivity Ohm · cm | Fracture tough- ness* MPa · m$^{1/2}$ |
|---|---|---|---|---|---|
| EKasic BM (SSiC) | Solid phase | <1.5 (B + C) | black | $10^3$–$10^4$ | 2.2 |
| EKasic D (SSiC) | Solid phase | <1.5 (Al + C) | black | $10^{-2}$– $10^1$ | 2.5 |
| EKasic T (LPSSiC) | Liquid phase | 5–6 (AlN + YAG**) | black | >$10^7$ | 3.5*** |

*measured using the bridge method (sharp crack), cf. K. A. Schwetz et al.: Journal of Solid State Chemistry 133, 68–76 (1997)
**YAG = Y—Al garnet ($Y_3Al_5O_{12}$)
***Corresponds to a value of 8.4 MPa · m$^{1/2}$ measured using the SENB method with a 0.5 mm notch width The high electric resistance of EKasic T is caused by the presence of a continuous vitreous grain-boundary phase which surrounds the SIC grains in an insulating manner in the form of a thin film (approx. 1 nm). Together with the sintering aid Y—Al garnet, at the triple junctions of the SiC grains this continuous grain-boundary phase forms the so called binder phase, which joins the SiC hard-material grains to form a strong composite. Since the microstructural development and the properties of liquid phase-sintered SiC are decisively influenced by the selection of the composition (type and amount of the SiC and the binder phase) and the specific sintering parameters (gas atmosphere, pressure, temperature, time), it is not surprising that it is already possible for a number of SiC materials with very different properties to be produced from the sintering additive system $AlN$—$Y_2O_3$ (or $RE_2O_3$ or YAG).

According to the method which is known from DE 3344263 (corresponds to U.S. Pat. No. 4,569,922, Inv.: K. Suzuki/Asahi Glass), silicon carbide powders are sintered, together with sintering additives based on 3–30% by weight AlN, 0–15% by weight oxides of the IIIa transition metals (in particular yttrium, lanthanum and cerium) and 0–20% by weight $SiO_2$, $Al_2O_3$ or $Si_3N_4$, under an argon or nitrogen atmosphere, without pressure or under gas pressure, at 2000–2200° C. for from 2 to 10 hours to form SiC shaped bodies with a density of over 95% of the theoretically possible density, which exhibit flexural strengths of >800 MPa both at room temperature and at 14000° C. The microstructure of these SiC sintered bodies exhibits elongate and/or platelike grains (mean grain length 3–5 μm) of an SiC—AlN mixed crystal and a crystalline grain-boundary phase. The composition of the sintered bodies essentially comprises SiC with 2–20% by weight Al, 0.2–10% by weight N, 0.2–5% by weight 0 and 0 to 15% by weight of a metal from group IIIa. With sintering additives comprising less than 3% by weight AlN, only deficient sintered densities are obtained.

According to the process for the liquid-phase sintering of starting powder mixtures which, in addition to SiC, contain 1–10% by weight AlN, 1–15% by weight $Y_2O_3$ and up to 8% by weight $SiO_2$ as sintering additives, which process is known from Japanese patent application No. 59-051384 (Publication No. 60-195057, 10.03.1985, Inventor: S. Nagano/Kyocera), sintered bodies with densities of between 95 and 99% TD which, due to their low resistivity of 0.5 ohm·cm, can be machined by spark erosion, are obtained after pressureless sintering for 2 3 hours under anargon atmosphere in the temperature range 1800–1950° C.

According to the method which is known from U.S. Pat. No. 5,298,470, dated Mar. 29, 1994 (corresponds to EP 419,271, Inv.: Chia et al./Carborundum), once again starting powder mixtures which, in addition to silicon carbide, contain 0.5–15% by weight AlN, 0.1–15% by weight $Y_2O_3$ (or other $RE_2O_3$) and up to 10% by weight $SiO^2$ as sintering additives are sintered without pressure under an argon atmosphere, preferably using a powder bed. The powder bed contains, in addition to SiC, the additives, which is intended to prevent the latter from becoming substantially depleted in the following sintered body, i.e. to prevent them from reacting with SiC to form gaseous decomposition products, which results in deficient densifying.

Claim 28 claims compact SiC sintered bodies with a high fracture toughness, with a microstructure characterized by, fine grains, homogeneity, a predominantly equiaxial grain shape and the presence of a discontinuous crystalline accompanying phase (preferably yttrium aluminate) in the interstices (triple junctions) of the Sic grains.

Claims 35 and 38 claim resistivities of less than $10^3$ ohm·cm, predominantly clean SiC-SiC grain boundaries and fracture toughnesses of at least 7 MPa·m$^{1/2}$, measured using the SENB method with notch widths of 0.5 mm.

Enriched levels of the elements aluminum and nitrogen can be detected in the Sic grains, but not in mixed crystal quantities (in the tenths of a percent to percent range), but rather insignificantly smaller quantities (200–300 ppm). According to the description of the process, this is not a case of pure liquid-phase sintering, but rather of mixed mode sintering, according to which in the initial phase liquid-phase sintering with particle rearrangement takes place, followed by solid state diffusion sintering.

As can be seen from column 17, lines 3–68 of U.S. Pat. No. 5,298,470, the liquid phase—apart from small discontinuous residual quantities—draws back to the triple junctions, and the second sintering stage, the solid state sintering, follows, making it possible to improve the properties of the sintered bodies.

According to column 11, lines 12 ff, the mixed mode sintering process may be carried out in a single stage, in the temperature range between 1900° C. and 2050° C. for three hours, or in two stages, for example one hour at 1900° C. plus one hour at 2050° C. For the pressureless mixed mode sintering process, the intention was obviously to produce fine-grained SiC sintered bodies with a high fracture toughness but without a continuous binder phase, since the prevailing opinion was evidently that the best properties of the end product can only be ensured with clean SiC-SiC grain boundaries.

However, with the proposed pressureless sintering methods, in particular in view of the long holding times and the comparatively high sintering temperatures, it is necessary to reckon with the known difficulties, such as a high loss of weight through the formation of volatile Al and Si suboxides ($Al_2O$, AlO, SiO) and the formation of highly porous edge zones, which not only requires expensive further machining of the sintered bodies obtained, but also is linked to a high level of wear to the heating and insulating material of the furnace device and to scrap during sintering caused by faulty temperature control.

According to the process for producing electrically insulating SiC which is known from WO 97/03030 of 01.30.1997 (Inv.: D. Maravic/Negawatt), high resistivities of >$10^7$ ohm·cm are only achieved in SiC shaped bodies if more than 6 to 7% by volume of binder phase fractions remain in the finished sintered body following the liquid phase sintering of SiC with the addition of $Y_2O_3+Al_2O_3$. Owing to the high levels of sintering additives (10–12% by weight) required and the high losses of weight (2.8 to 4.5% by weight) which ensue during the pressureless sintering, this method is somewhat disadvantageous.

It has been reported by the Institut für Nichtmetallische Anorganische Materialien [Nonmetallic Inorganic Materials Institute] of the University of Stuttgart (Dissertation M. Nader 1995, I. Wiedmann et al.:"Flüssigphasensintern von Siliciumkarbid" [Liquid-phase sintering of silicon carbide], in: Werkstoffwoche 1996, Symposium 7: Materialwiss. Grundlagen, Ed. F. Aldinger and H. Mughrabi, DGM Informationsgesellschaft, Oberursel (1997), 151–520), that SiC with 10% by volume additives based on 60 mol % AlN—40 mol% $Y_2O_3$ can be completely densified without using a powder bed and without pressure at temperatures of 1950–2000° C. under nitrogen or argon protective gas.

In view of the starting composition of 84.4 SiC—10.3 $Y_2O_3$—3.0 AlN—2.3 $SiO_2$ (% by weight) and the loss of weight during sintering of <3%, it is possible to conclude that there is at least 10% by weight of binder phase in the sintered bodies. The microstructure is fine-grained and presents globular SiC grains and a continuous binder phase which surrounds the SiC grains. $Y_2O_3$ and yttrium-aluminum-silicon oxynitride were detected in these bodies as crystalline binder-phase constituents, using X-ray diffraction analysis. These sintered bodies are in great need of improvement not only because of the large quantity of binder phase but also because of their macroscopic inhomogeneity (porous edge zones and segregation channels). Owing to very high mass losses, the sintering additives based on $Al_2O_3$—$Y_2O_3$ instead of AlN—$Y_2O_3$ require sintering to be carried out in the powder bed. According to the process which is known from DE 19730770 (1998, inv.: H. Kölker et al./Elektroschmelzwerk Kempten GmbH), SiC starting powder mixtures containing 11.6 or 6.1% by weight sintering additives based on AlN—$Y_2O_3$ or AlN—YAG undergo gas pressure sintering under a nitrogen or argon atmosphere to form pore-free SiC bodies. As shown by transmission electron microscope examinations, it was possible to detect the binder phase in the sintered body as more than 10% amorphous or anamorphous film with a width of 15 Å in the Sic grain boundaries.

The fracture toughness, measured using the bridge method (sharp crack), at 3.0 MPa·m$^{1/2}$, was only 20–40% higher than that of solid state sintered Sic (cf. Table 1, commercially available material variant EKasic D).

The production of even tougher SiC, i.e. the further improvement in the fracture toughness of liquid phase-sintered Sic, has recently been achieved by modification of the microstructure using so-called "in situ platelet reinforcement". In this case, a two-stage sintering process or a high-temperature treatment of the sintered bodies following the sintering results in the formation of a microstructure with plateletlike sic grains. Due to the anisotropic grain growth of alpha-SiC at temperatures above the sintering temperature, the globular grains are redissolved to form plateletlike grains, the aspect ratio (ratio of platelet length to platelet thickness) can be influenced by varying the alpha-/beta-SiC content in the starting powder (cf. I. Wiedmann et al.: "Fl üssigphasensintern von Siliciumcarbid" [Liquid-phase sintering of silicon carbide], in: Werkstoffwoche 1996, Symposium 7: Materialwiss. Grundlagen, Ed.F. Aldinger and H. Mughrabi, DGM Informationsgesellschaft,Oberursel (1997), 151–520).

However, platelet reinforcement is also possible starting from pure alpha-SiC powder (without any beta-SiC content). For example, if a commercially available EKasic T containing 5 to 6% by weight of binder phase and having a fracture toughness of 3.2 Mpa·m$^{1/2}$ is annealed at 2050° C. under an argon pressure of 20 bar for four hours, a 6H→4H SiC polytype transformation takes place during the recrystallization (cf. Table 2), and a homogeneous platelet microstructure with grain aspect ratios in the range from 2:1 to 10:1 is obtained. The mean platelet length, determined by image analysis, was 4.5 pm, the maximum platelet length approx. 20 pin. The K1c value determined using the bridge method was 4.0±0.2 MPa·m$^{1/2}$, i.e. the in situ platelet reinforcement led to a further increase in the fracture toughness of 25%.

TABLE 2

Characterization of the commercially available EKasic T, tempered Ekasic T - sintered body and of the alpha-SiC sintering powder with regard to their SiC polytype composition

| SiC polytype (% by weight) | α-SiC sintering powder (green) | EKasic T Globular microstructure (sintered state) | EKasic T Platelet microstructure (tempered) |
|---|---|---|---|
| 15 R | 7 | 4 | — |
| 6 H | 89 | 88 | 27 |
| 4 H | 4 | 8 | 73 |

According to the method which is known from U.S. Pat. No. 5,656,218 dated Aug. 12, 1997 (B. W. Lin et al./ Industrial Technology Research Inst./Taiwan), the fracture toughness can also be increased by 22% by in situ platelet reinforcement using Sic sintering powder comprising alpha-SiC and beta-SiC in the weight ratio alpha-SiC/beta-SiC of 90:10 to 10:90, together with 5 to 20% by weight sintering additives based on $Al_2O_3$—$Y_2O_3$ and with two-stage sintering. In the two-stage sintering process, firstly consolidation by sintering is carried out at between 1800 and 1950° C. for 0.5 to 8 hours, followed by annealing at 1900 to 2200° C. for 0.1 to 4 hours. The fracture toughnesses, determined using the SENB method with an initial crack width of 0.15 mm, of a Sic specimen sintered with 3.8% by weight $Y_2O_3$ and 6.2% by weight $Al_2O_3$ were 4.9 MPa·m$^{1/2}$ (fine grained globular microstructure) and 6.0 MPa·m$^{1/2}$ (platelet microstructure with mean platelet lengths of <5 μm). Owing to the relatively high raw material and process costs, this method is as yet unsuitable for the mass production of liquid phase sintered Sic.

The good materials properties of the liquid phase sintered EKasic T have nowadays led to its use being preferred in applications which require hard, tough components which are able to withstand thermal shocks. Examples of such applications are dewatering elements in paper making machines, where the minimum possible wear has to be ensured in particular through a high edge stability of the ceramic plates (resistance to flaking). Furthermore, it is known that liquid-phase-sintered Sic is of particular importance, for example, as a functional ceramic for cooking hob hotplates or substrate plates for recording and reading heads and as a structural ceramic for high speed gas sealing rings or rolling contact bearings (balls, rolls, rings), since it has the following advantages over the liquid-phase-sintered silicon nitride which has hitherto been preferentially used in these application sectors:

SiC is more favorable in terms of powder costs, the thermal conductivity, the stiffness (modulus of elasticity) and the hardness of the SiC are higher, and the resistance to corrosion is significantly better.

However, the known liquid-phase-sintered SiC materials still present insufficient fracture toughnesses and an electric resistance which is too low compared to liquid phase sintered silicon nitride.

As is clear from the extensive prior art, it has not previously been possible to produce high density, liquid-phase-sintered SiC shaped bodies with a globular, fine grained microstructure and containing small amounts of binder phase at low cost while achieving a high fracture toughness of at least 4.0 MPa·m$^{1/2}$ (measured using the bridge method) and high resistivities in the range from $10^7$ to $10^{12}$ ohm·cm.

This results in the object of providing highly densified, virtually pore-free shaped bodies of liquid-phase sintered SiC which exhibit improved mechanical and electrical properties.

A further object of the invention is to specify a method with which shaped bodies of this nature having the desired properties can be produced economically and reproducibly in a simple manner, i.e. without using a two-stage high temperature sintering process for in situ microstructure reinforcement.

BRIEF SUMMARY OF THE INVENTION

The first object is achieved by means of a 5 polycrystalline SiC shaped body which comprises 96% by weight to 99.5% by weight of a hard material phase, 0 to 0.1% by weight free carbon, and a partially crystalline binder phase, the hard-material phase comprising SiC and a Si—C—Al—O—N mixed crystal containing 0.2 to 1.5% by weight dissolved aluminum, 0.1 to 0.5% by weight dissolved nitrogen, 0.01 to 0.2% by weight dissolved oxygen, the hard-material phase being in the form of globular grains with a mean grain size of <4 μm, at least three grains enclosing a triple junction the globular grains having a structure with a core and a shell surrounding the core, the core comprising SiC and the shell comprising a Si—C—Al—O—N mixed crystal, the mixed crystal having an Al/N atomic ratio of 1.0:1.0 to 2.0:1.0, and the partially crystalline binder phase being formed from crystalline and amorphous phases of the rare earth —Al—Si—O quaternary system, the amorphous phase being present in the form of a grain boundary film which surrounds the globular grains, and the crystalline phase being present in the form of accumulations at the triple junctions containing rare earth aluminate.

Figure 1:
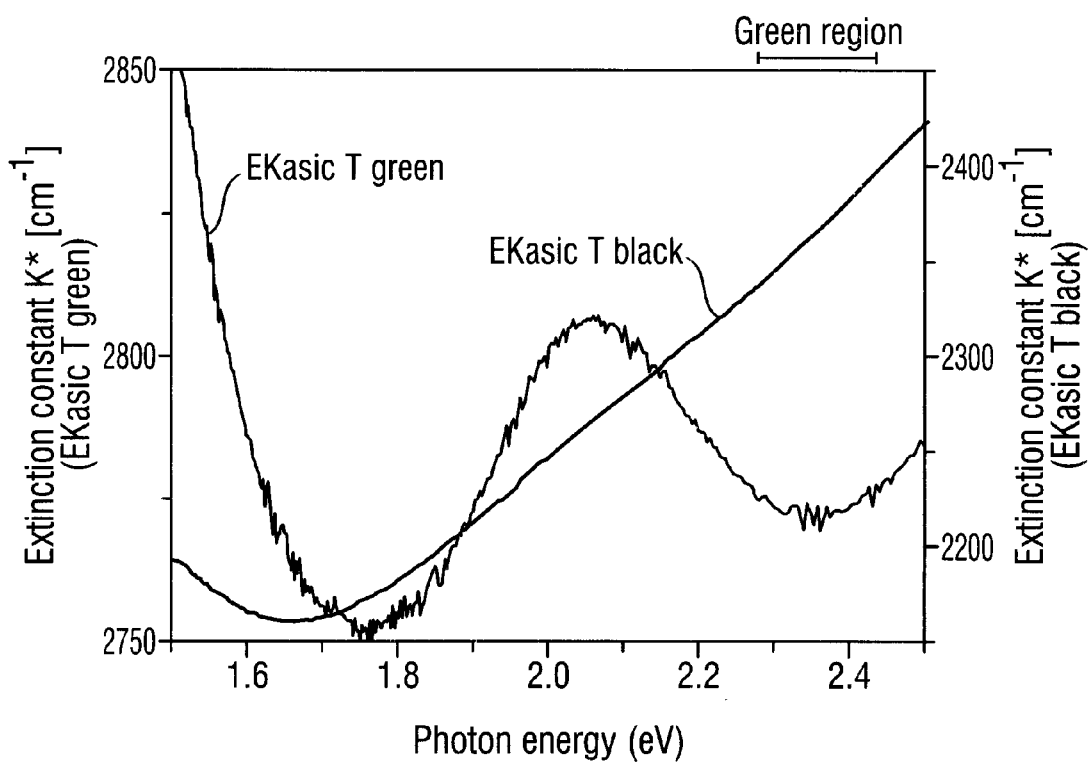
FIG. 1 is a graph showing a comparison of the optical absorption spectra of a shaped body of the invention and a closely related shaped body.

In the context of the invention, rare earth metal (RE) is to be understood as meaning the metals Sc, Y and the lanthanides.

The rare earth metal is preferably Y, Yb or Nd.

Preferably, the rare earth metal is Y.

Particularly preferably, the hard-material phase contains 0.3 to 1.1% by weight dissolved aluminum, 0.2 to 0.4% by weight nitrogen and 0.05 to 0.15% by weight dissolved oxygen.

The atomic ratio of Al:N in the Si—C—Al—O—N mixed crystal is preferably 1.2:1 to 1.7:1.

The mean grain size of the hard-material phase is preferably in the range from 0.8 to 1.2 $\mu$m.

The binder phase preferably contains both a glass film, which continuously surrounds the hard material grains, and crystalline Y—Al garnet at the triple junctions of the hard-material grains.

The SiC shaped body according to the invention preferably has the following properties: density at least 99.5% of the theoretically possible density; dark green coloring of ground sections or polished surfaces through characteristic light absorption in the orange spectral region between 1.8 and 2.2 eV, resistivity of at least $10^7$ ohm·cm, and fracture toughness of at least 4.0 MPa·m$^{1/2}$, measured using the bridge method.

According to the following equation $$1.242/E=\lambda$$

E=photon energy in eV
$\lambda$=wavelength in $\mu$m (1 $\mu$m=1000 nm)
the extinction maximum at 2.05 eV corresponds to a wavelength of 606 nm (orange).

Preferably, the resistivity is in the range from $10^9$ to $10^{12}$ ohm·cm, and the fracture toughness is in the range from 4.1 to 4.6 MPa·m$^{1/2}$.

The polycrystalline Sic shaped body according to the invention is produced, for example, by gas-pressure sintering of a porous intermediate, which has been decarburized down to a residual content of at most 0.1% by weight free carbon, has been partially oxidized to form 1.0 1.5% by weight SiO$_2$ and comprises sinterable SiC powder which contains up to 4% by weight sintering aid, based on a mixture of rare earth sesquioxide (RE$_2$O$_3$) or rare earth aluminate (RE aluminate) with aluminum nitride, in a sinter-HIP installation using argon as the inert gas and pressure transfer medium, at a temperature of 1900–2000° C. and a pressure from 3 to 100 bar.

To produce the intermediate, a powder mixture consisting of SiC, up to 6% by weight organic pressing aids, and up to at most 4% by weight sintering aid based on RE$_2$O$_3$ or RE aluminate with aluminum nitride is firstly densified to form a preshaped powder compact. This preshaped powder compact is subjected to a first preheating in order to remove the binder at 650° C. under a flowing argon atmosphere and to a second preheating in an oxygen containing atmosphere at 400–500° C., until a porous intermediate which has been decarburized down to a residual content of at most 0.1% by weight free C and has been partially oxidized to form from 1.0 to 1.5% by weight SiO$_2$ has formed. This decarburized and partially oxidized intermediate is introduced into a sinter-HIP installation and is sintered, under an argon pressure of from 2 to 10 bar, with a loss of mass of at most 2.5% by weight, at 1900–2000° C., until gas tight SiC sintered bodies containing at most 4% by weight binder phase are formed. Finally, this sintered body undergoes further densification under isothermal conditions, with the gas pressure being raised to up to 100 bar by the argon gas used as pressure transfer medium, until the SiC shaped body according to the invention with a density of at least 99.5% TD is formed.

Both alpha-SiC and beta-SiC powder with a maximum particle size of 10 $\mu$m, preferably 5 $\mu$m and a mean particle size of <2 $\mu$m, preferably <1 $\mu$m, may be used as the SiC starting material for the powder mixtures.

Alpha-SiC from the large scale industrial ACHESON SiC production containing at least 80% by weight SiC as the 6H polytype is preferably used as the starting material which, following autogenous milling to sintering fineness (BET surface area: 5 to 15 m$^2$/g) and wet chemical cleaning contains, in addition to SiC, metallic impurities forming a total of <0.15% by weight, free carbon forming at most 0.5% by weight and adhering SiO$_2$ forming <1.0% by weight.

The sintering additive used is advantageously a mixture of aluminum nitride with a compound from the group of rare earth oxides or rare earth aluminates in powder form as grain fractions of 10 $\mu$m and finer, preferably 7 $\mu$m and finer, with mean particle sizes in the range from 1 to 2 $\mu$m. The oxide rare earth compounds are always used in combination with aluminum nitride, the proportion of AlN in the mixture with the RE$_2$O$_3$ additive corresponding to an RE$_2$O$_3$/AlN molar ratio in the range from 1:4 to 1:14, and in the mixture with an aluminate-based additive to at least 10 to 50% by weight AlN.

Preferably, the proportion of AlN in the mixture with RE$_2$O$_3$ is from 65 to 70% by weight AlN and in a mixture with Y—Al garnet is from 30 to 35% by weight AlN.

Irrespective of whether the oxides or aluminates are used together with AlN, the amount of the sintering additives must in each case be dimensioned in such a way that the final powder batches contain at most 4% by weight sintering additives, based on the SiC without pressing aids.

To produce the green bodies, the SiC powder together with up to 4% by weight sintering additives and up to 6% by weight pressing aids is preferably processed in a manner known per se to form a slip and is then processed in a suitable way, for example by spray drying of the previously produced slip, to form free-flowing granules. Polyethylene glycol, polyvinyl alcohol and stearic acid are examples of pressing aids which can be used.

The shaping of the spray dried granules to form green bodies can be carried out by customary known measures, for example by die pressing or isostatic pressing at room temperature, a pressure of 300–3000 bar, preferably 500–2500 bar generally being employed. After the shaping, the green bodies should exhibit a theoretical density of at least 50%, preferably at least 60%, based on the theoretical density of the mixture.

The binder is removed from the preshaped green bodies in a protective-atmosphere furnace at temperatures of up to 700° C., and then these green bodies are heated, with air allowed to enter, at up to 500° C. in order to remove the free carbon down to levels of $\leq$0.1% by weight free C and to form from 1.0 to 1.5% by weight of additional SiO$^2$.

Higher levels than 0.1% by weight free C in the green bodies from which binder has been removed and which have been decarburized result in a black discoloration, reduced fracture toughnesses, reduced resistivities and reduced resistance to corrosion and oxidation in the highly densified SiC shaped bodies produced from the green bodies.

Furthermore, the reduction of the free C content in the green body to $\leq$0.1% by weight is of decisive importance for the consolidation by sintering of powder mixtures containing small amounts of sintering additives, with less than 2% by volume added additive. It has been established that gas pressure sintering of green bodies containing >0.1% by weight free C and 1.5% by volume sintering additives based on YAG—AlN or $RE_2O_3$—AlN no longer results in adequate densifying. Consequently, the sintering HIP process according to the invention opens up the possibility of densifying liquid phase sintered SiC with minimal additives which are otherwise the exclusive preserve of the expensive clad HIP process or axial hot pressing. The formation of more than 1.5% by weight additional $SiO_2$ during the preheating to remove binder and decarburize the green bodies brings no advantage, since this simply causes the loss of mass during sintering to increase owing to the reaction of excess $SiO_2$ with SiC, in accordance with the following equation:

$$2\ SiO_2 + SiC \rightarrow 3SiO + CO.$$

The green bodies from which binder has been removed and which have been decarburized are sintered in an autoclave furnace (sinter-HIP installation) under a pressure of 5 bar argon and at temperatures of 1900–2000° C. until a closed porosity at approx. 95% TD is reached, and are then heated further under a pressure of 20 to 100 bar argon until the residual porosity is eliminated. During the gas-pressure sintering under 5 bar of argon, the reaction of the additives AlN, $RE_2O_3$ or RE aluminate with the $SiO^2$ which is present on the SiC powder particles results in the formation of an RE—Si—Al—O—N liquid phase at well below the sintering temperature. As the temperature rises, the viscosity of the liquid phase falls and initially the SiC particles may be rearranged to form a more densely packed arrangement under the action of the capillary forces. In the range of the maximum sintering rate, beyond approx. 1850° C., SiC fine grains dissolve in the liquid phase and there is a shell-like deposition of Si—C—Al—O—N mixed crystals on SiC "coarse grain" which is present (core shell structure), which deposition is accelerated by the external pressure.

As has been established by chemical analyses of the sintered bodies according to the invention (see examples), the shell zones of the SiC grains comprise the so-called sicalons, in which some of the Si and C atoms in the SiC are replaced by Al, N and C atoms so as to form solid solutions of Si—C—Al—O—N of different compositions. While the SiC is redissolving to form Si—C—Al—O—N mixed crystals, until a final density of >99.5% TD is reached, the composition of the liquid phase changes, i.e. its Al and N contents are depleted and its RE, Si and C contents are enriched.

During cooling of the sintered bodies, the liquid phase solidifies forming a solid, partially crystalline binder phase, consisting of crystalline RE aluminate (e.g. Y—Al garnet), which is preferentially formed in the triple junctions between the SiC crystals, and an amorphous phase which is present in a thin film in the grain boundaries. The binder phase of the sintered bodies according to the invention is therefore at least two-phase; in addition to a crystalline aluminate phase, between the grains there is an aluminosilicate glass phase which is preferably free of rare earth and nitrogen and is continuous, i.e. forms a 3-dimensional network.

The control of pressure, temperature and sintering atmosphere is of decisive importance with regard to achieving the sintered-body properties, in particular the high level of densification of >99.5% of the theoretically possible density and avoidance of a porous edge zone (sintering skin) on the sintered bodies. The argon gas pressure during the sintering is at least 2 bar, preferably in the range from 5–100 bar. If lower gas pressures, for example of 1.5 bar, are used, the RE—Si—Al—O—N liquid phase is decomposed in edge zones close to the surface owing to reaction with SiC to form gaseous products ($Al_2O$, SiO, CO and $RE_2$, cf. T. Grande et al.: "Effect of weight loss on liquid-phase-sintered SiC" in: J. Am. Ceram. Soc. 80, No. 4, 1047–52, 1997) and the sintered bodies have a sintering skin of a thickness of 0.4 mm, in the form of a layer of increased porosity.

SiC shaped bodies having such a porous edge layer are less suitable for virtually all applications and require expensive and time-consuming further machining using diamond tools. The final pressure at the maximum sintering temperature is 20–100 bar, since higher pressures are not required for additional densification of the shaped bodies to densities of >99.5% TD and would also lead to higher equipment and operating costs.

The use of gaseous nitrogen or nitrogen-argon gas mixtures instead of argon as the sintering atmosphere has not proven advantageous, since this causes an undesirable increase in the viscosity of the liquid phase and a change in the binder phase composition.

Sintering temperatures of 2000° C. should not be exceeded during the gas pressure sintering, in order to avoid exaggerated grain growth. Slight isotropic grain growth takes place during sintering; by way of example, the SiC grain size increases from an average of 0.7 $\mu$m to only 0.9 $\mu$m, with the result that good strength properties of the end product with 4-point flexural strengths in the range from 550–650 MPa and a 100% intercrystalline fracture mode can be ensured. The linear shrinkage of about 15–20% associated with the gas pressure sintering takes place with the original geometric shape of the green bodies being retained and can be accurately determined, so that it is often possible to dispense with the subsequent machining of the sintered bodies.

The loss of weight during sintering of on average 2% is mainly attributable to the fact that some of the $SiO_2$ which is present in the green bodies has reacted with SiC to form SiO and CO. Furthermore, from the nitrogen balance in the starting products and end products, it is possible to conclude that the nitrogen which is added as aluminum nitride has not completely joined aluminum and oxygen in passing from the liquid phase to the Si—C—Al—O—N solid solution, but rather small quantities are also released into the gas atmosphere in elemental form. The possibility of extensive Si—C—Al—O—N formation is particularly advantageous, since this also results in improved liquid phase wetting and enables the amount of oxide binder phase formed from a given amount of liquid phase to be reduced. The resultant increase in the hard-material proportion is also of benefit to the corrosion and wear properties.

The liquid-phase sintered SiC shaped bodies according to the invention are clearly superior to those which have been produced according to the prior art using >4% by weight sintering additives based on mixtures of aluminum nitride with $RE_2O_3$ or rare earth aluminate by gas-pressure sintering in terms of their fracture toughness and their resistivity, as has been clearly demonstrated by comparative tests. The fracture toughness achieved is at least equal to or higher than that which it has previously been possible to achieve by in situ platelet reinforcement.

The liquid phase-sintered SiC shaped bodies according to the invention can therefore be used for a wide range of applications. For example, they can be used both as structural materials in mechanical engineering and as functional materials in electrical engineering. Therefore, the SiC shaped bodies according to the invention can be used in particular as tough structural ceramic for gas sealing rings at high rotational speeds and centrifugal forces or for rolling-contact bearing components or for armor plates (e.g. for bulletproof vests) and as an insulating functional ceramic for hotplates, pan bases and substrate plates for recording and reading heads.

The invention therefore also relates to gas sealing rings, rolling-contact bearing components, armor plates, hotplates, pan bases or substrate plates consisting of SiC shaped bodies according to the invention.

FIG. 1 shows the optical extinction spectra of the sintered bodies from Example 3 ("EKasic T green") and comparative example 12 C ("EKasic T black"). As can be seen from a comparison of the two spectra, a characteristic absorption band in the orange region at 1.8 to 2.2 eV is responsible for the green color of the sintered bodies according to the invention. Furthermore, the spectrum of the green silicon carbide exhibits higher transmission in the green spectral region. The dark-green color offers a decorative effect and is of interest in particular for the use of the sintered bodies according to the invention in decorative applications, such as for example as a hotplate in cooking areas.

Figure 2:
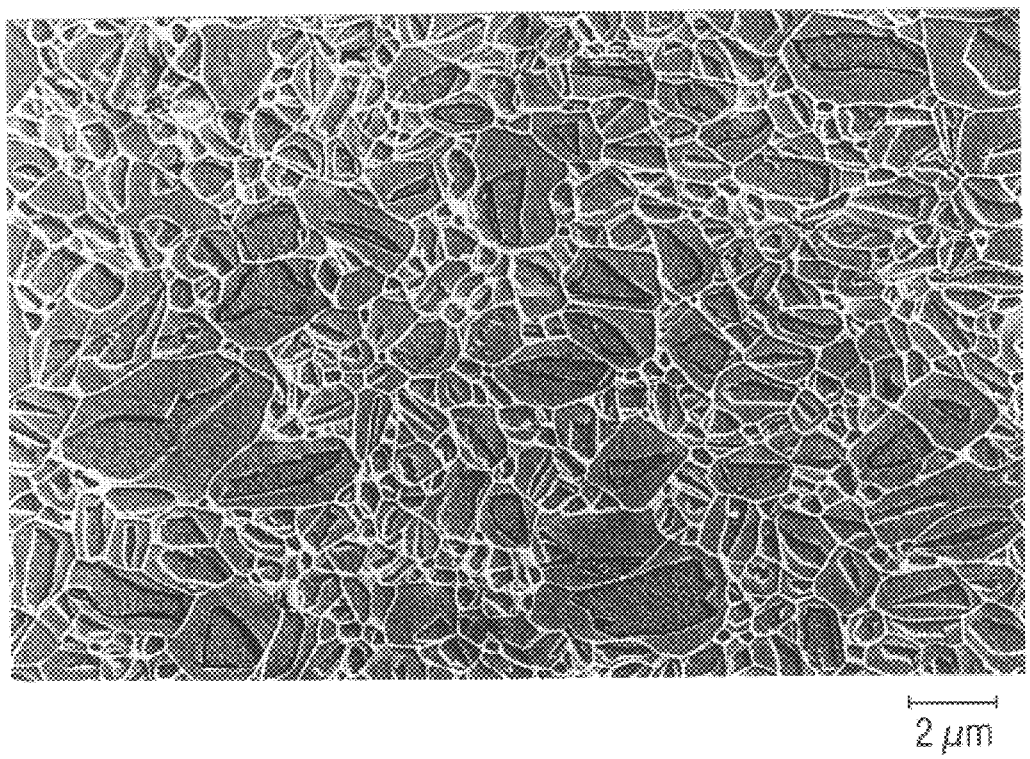
FIG. 2 is an SEM-micrograph showing the plasma-etched microstructure of a shaped body of the invention.

FIG. 2 shows the plasma-etched microstructure of the sintered body with a sintered density of 3.23 g/cm$^3$, an overall porosity of 0.1% by volume, a binder phase content of 2.8% by weight, a resistivity of 1.5×10$^{11}$ ohm·cm and a fracture toughness of 4.3 MPa·m$^{1/2}$ which is obtained by gas-pressure sintering of alpha-SiC with 3% by volume added sintering additive based on $Y_2O_3$—AlN (Example 3). The SiC hard-material grains (gray) contain 1.04% by weight dissolved aluminum, 0.34% by weight dissolved nitrogen and 0.10% by weight dissolved oxygen. They have a globular grain form and a core shell structure comprising more deeply etched primary SiC grains (cores) and less deeply etched Si—C—Al—O—N mixed crystals (shells). The Al/N atomic ratio in the Si—C—Al—O—N is 1.6. The binder phase (white) occurs in the grain boundaries as an amorphous thin film and for the most part in triple junctions between the SiC grains as a crystalline Y Al garnet. A grain size distribution of less than 5 µm and a mean SiC grain size of 0.9 µm were determined by image analysis.

The following examples serve to explain the invention further.

Examples 1 to 4 and Comparative Examples 1C to 4C

The starting powder used was green alpha SiC sintering powder with a specific surface area of 12.1 m$^2$/g and a mean particle size of 0.7 µm. The powder contains 0.30% by weight free carbon and 0.45% by weight residual oxygen. The sintering additives used were fine aluminum nitride powder in combination with pulverulent Y—Al garnet ($Y_3Al_5O_{12}$, "YAG") or $Y_2O_3$ (yttrium sesquioxide). The sintering additives had a particle size distribution of finer than 10 pm and mean particle sizes in the range from 1.2 to 1.5 µm. Aqueous slips were prepared in accordance with the formulations given in Table 3, with systematic variation of the type and quantity of sintering additives within the limits of 1.5 to 6.0% by volume added sintering additive, 6 parts by weight of organic pressing aids also being used per 100 parts by weight SiC plus sintering additive (=doped sintering powder).

Firstly, a 60% strength dispersion of the SiC powder in water was prepared with stirring, in which the sintering and pressing aids had previously been dissolved or suspended. Following homogenization of the dispersion, a defined weight per liter of >1500 g/l was established by dilution with water, and the finished worked-up slip was dried by means of a spray drier. The free-flowing pressable granules obtained (granule diameter distribution 30 300 µm) with a residual moisture content of approximately 0.3% by weight were then pressed isostatically under a pressure of 200 MPa to form cylinders of 35×50 mm (35 mm diameter×50 mm height) with green densities of 62% TD. Then, the pressed parts were preheated in a protective-gas furnace for gentle removal of the lubricants and binders under flowing argon protective gas at 650° C. (binder removal) and then in air at 450° C. to oxidize and remove adhering carbon (decarburization).

TABLE 3

| Example No. | Composition of the powder batches | | | | | |
|---|---|---|---|---|---|---|
| | SiC* | $Y_2O_3$ | YAG | AlN | Total sintering additives | |
| | % by weight | % by weight | % by weight | % by weight | % by weight | % by volume |
| 1 | 98.24 | 0.56 | — | 1.20 | 1.76 | 1.5 |
| 2 | 98.08 | — | 1.30 | 0.62 | 1.92 | 1.5 |
| 3 | 96.48 | 1.12 | — | 2.40 | 3.52 | 3.0 |
| 4 | 96.18 | — | 2.59 | 1.23 | 3.82 | 3.0 |
| 1C | 94.72 | 1.68 | — | 3.60 | 5.28 | 4.5 |
| 2C | 94.26 | — | 3.89 | 1.85 | 5.74 | 4.5 |
| 3C | 92.96 | 2.24 | — | 4.80 | 7.04 | 6.0 |
| 4C | 92.35 | — | 5.19 | 2.46 | 7.65 | 6.0 |

*Contains 0.3% free C and 0.9% adhering $SiO_2$

The binder removal and decarburization took place according to the following temperature/time programs:
Binder removal (flowing argon)
20–650° C. 20 hours
Holding at 650° C. 5 hours
Decarburization (stationary air)
20–450° C. 4.5 hours
Holding at 450° C. 3.0 hours As can be seen from Table 4, which compares exemplary analyses of the green bodies which have only undergone binder removal and of the green bodies which have undergone binder removal plus decarburization, from Examples 1, 2, 3C and 4C, there is virtually no change in terms of nitrogen content, while as a result of the decarburization treatment in air the free carbon content is reduced drastically from 0.5 to 0.1% by weight, and the oxygen content is increased on average by 0.6% by weight. This increase in the oxygen level corresponds to a formation of approximately 1.2% by weight $SiO_2$ as a result of slight partial oxidation of the SiC submicron powder in accordance with the following equation:

$$SiC+2O_2 \rightarrow SiO_2+CO_2$$

TABLE 4

Chemical analyses of SiC green bodies which have undergone binder removal (BR) in industrial-grade argon and have then been decarburized (DC) by annealing in air

| Element | Example 1 | | Example 2 | | Example 3C | | Example 4C | |
|---|---|---|---|---|---|---|---|---|
| % by weight | BR | DC | BR | DC | BR | DC | BR | D |
| Free C | 0.50 | 0.10 | 0.50 | 0.10 | 0.50 | 0.10 | 0.40 | 0.10 |
| O | 0.91 | 1.50 | 1.00 | 1.60 | 1.30 | 1.90 | 2.30 | 2.90 |
| N | 0.33 | 0.34 | 0.16 | 0.17 | 1.30 | 1.30 | 0.70 | 0.71 |

Free C analysis in accordance with DIN 51079-3; O and N analysis using carrier-gas hot extraction The pressed bodies which have been cooled to room temperature, from which the binder has been removed and which have been decarburized were then consolidated by sintering in graphite crucibles, which had been placed in the heating zone of a sinter-HIP furnace installation, under an argon pressure of 5–95 bar. The consolidation by sintering took place in accordance with the following temperature/pressure program:

```
20–1200° C./ 0.01 bar: 90 min
1200–1750° C./ 5 bar: 90 min
1750–1960° C./ 5 bar: 60 min
     1960° C./ 5 bar: 40 min
     1960° C./ 95 bar: 20 min
```

After the holding time had ended, the furnace was switched off and the sintered bodies cooled to room temperature in the furnace under a pressure of 85–90 bar.

The sintered bodies had a density corresponding to >99.5% of the theoretically possible density and, during the liquid-phase sintering, experienced linear shrinkage of 18% and a loss of weight of around 2%.

After the buoyancy density measurements had been carried out, ceramographic ground sections were produced from the shaped bodies by cutting, grinding and polishing, for the microstructure and porosity examinations, and cylindrical pellets of dimensions 26×5 mm were produced from the shaped bodies by circular and face grinding, for the determination of the resistivity, and prismatic bend test bars 3×4×45 mm were produced from the shaped bodies by cutting, grinding and lapping, for determination of the fracture toughness. The highly polished ground sections of the sintered bodies all revealed a dark green color. The volume percentage porosity (P), for the calculation of the relative density as a percentage of the theoretical density (% TD) in accordance with 100 P=% TD, were determined by light microscopy using a Kontron image analysis system on the basis of microscopical images of polished ground sections with in each case ten measurement fields under 500 times magnification. The mean grain size was also determined by image analysis using scanning electron microscopical images under 2500 times magnification by measuring in each case 1000–1500 grains (diameter of equivalent circular area) following microstructural development of the ground sections with chemical plasma etching ($CF_4/O_2$ gasmixture 1:1, 3 min, $10^{-5}$ bar). To characterize the dark green color, optical extinction measurements were carried out on thin sections (thickness <50 $\mu$m) using a Perkin-Elmer grating spectrometer (type lambda 19) in the spectral region 1.5 to 4.0 eV photon energy (corresponding to wavelengths from 310 to 820 nm). The resistivity was determined at room temperature using the three conductor measurement method. The measurement principle is based on measuring the current through the specimen at a predetermined DC voltage of 100 volts and discharging surface currents to ground via a guard ring electrode. The DC voltage source used was a precision pico-ampere/tera-ohmmeter PATO 12 produced by Dr. Thiedig, Berlin, which both presets the voltage and converts the measurement current through the specimen directly to the absolute resistance. The fracture toughness measurements were carried out with plane parallel ground bend-test bars by means of crack propagation using the bridge method (cf. K.A. Schwetz et al.: Journal of Solid State Chemistry 133, 68–76 (1997)). The fragments of the bending bars were comminuted in a precision drilling mill with SiC milling inserts to a grain size of less than 50 $\mu$m for the X-ray diffraction phase analysis, the chemical elemental analysis and determinations of the percentage content of binder phase. In the comminuted sintered bodies, it was possible, by X-ray diffraction, to detect, in addition to SiC, consistently Y—Al garnet (YAG) as crystalline binder phase. To determine the percentage content of binder phase, the comminuted sintered bodies were heated at 220° C. to dissolve the binder phase with concentrated hydrochloric acid in an autoclave lined with polytetrafluoroethylene (PTFE). The binder phase fraction can be calculated from the difference between 100% and the insoluble Sic fraction which remains following the pressure digestion ("residual SiC"). To detect changes in the chemical composition of the SiC as a result of the liquid phase sintering, the residual SiC was also subjected to quantitative elemental analysis. Consistently, in the residual SiC it was impossible to detect any yttrium, but there was considerable substitution of silicon by aluminum and less substitution of carbon by nitrogen and oxygen (Si—C—Al—O—N formation).

Table 5 compares the chemical analyses of the sintered bodies from Examples 1, 2, 3 and 3C with those of the SiC residues following the extraction of the binder phase using pressure digestion.

TABLE 5

Chemical analyses (data in % by weight)

| Example No./Material | Al | Y | O | N | C*** | Si** | Al/N atomic ratio in the SiCAlON |
|---|---|---|---|---|---|---|---|
| 1/SB | 0.80 | 0.40 | 0.42 | 0.17 | 28.91 | 69.3 | |
| 1/R | 0.60 | —* | 0.14 | 0.22 | 29.70 | 69.3 | 1.4 |
| 2/SB | 0.77 | 0.43 | 0.32 | 0.19 | 29.03 | 69.3 | |
| 2/R | 0.36 | — | 0.08 | 0.19 | 29.57 | 69.8 | 1.0 |
| 3/SB | 1.50 | 0.82 | 0.86 | 0.31 | 28.53 | 68.0 | |
| 3/R | 1.04 | —* | 0.10 | 0.34 | 29.51 | 69.0 | 1.6 |
| 3C/SB | 2.82 | 1.62 | 1.72 | 0.52 | 27.62 | 65.7 | |
| 3C/R | 1.41 | —* | 0.13 | 0.50 | 29.70 | 68.3 | 1.5 |

*= Value less than 0.001% by weight (<10 ppm) SB = sintered body
**= Indirectly from the difference from 100% by weight R = residual SiC
***= Total C content (free C content ≦ 0.1% by weight)

The chemical analyses showed that the residual SiC, as a function of the selected quantity of liquid phase in the sintered body, still contains from 0.4 to 1.4% by weight aluminum, 0.2 to 0.5% by weight nitrogen and 0.1 to 0.2% by weight oxygen in solid solution. The Al/N atomic ratio in the Si—C—Al—O—N mixed crystal is in the range from 1.0 to 2.0, preferably in the range from 1.2 to 1.7.

It was found that the residual SiC was virtually yttrium-free, proving that, using the method according to the invention, yttrium atoms cannot be incorporated into the lattice of the silicon carbide. Since it was possible to detect Y—Al garnet by X ray diffraction, it appears that the yttrium is present primarily in the form of the compound $Y_3Al_5C_{12}$ as crystalline constituent of the binder phase. The proportion of YAG in the sintered body can be determined approximately by the following relationship:

$$Y \times 2.225 = YAG$$

Y=% by weight Y, by inductive plasma emission spectroscopy (ICP-OES) following alkaline digestion of the sintered bodies YAG=% by weight $Y_3Al_5C_{12}$ 2.225=stoichiometric factor for converting from yttrium to YAG Since the nitrogen levels in the residual SiC exhibit good correspondence to those of the sintered bodies, it is possible, within the scope of analytical accuracy, to conclude that the binder phase is free of nitrogen and that all the nitrogen is included as Si—C—Al—O—N.

Table 6 gives the measured values for the sintered density, the porosity, the resistivity and the fracture toughness as a function of the binder phase contents together with the free C levels in the sintered bodies produced. These results show that, independently of the amount of binder phase, sintered densities of >99.7% TD, free C contents of >0.1% by weight and resistivities of >$10^7$ ohm·cm are achieved, but only with sintering additive additions of $\leq$3% by volume, corresponding to binder phase contents of <4.2% by weight, was it possible to obtain the sintered bodies according to the invention with fracture toughnesses of at least 4.0 MPa·m$^{1/2}$.

The highest resistivities of $10^{11}$ to $10^{12}$ ohm·cm and fracture toughnesses of 4.3 to 4.5 MPa·m$^{1/2}$ are achieved starting with 3% by volume of added sintering additive, corresponding to binder phase contents of approx. 3% by weight, which is advantageous, for example, for the use of these sintered bodies as hotplates. In view of their relatively high binder phase contents, the shaped bodies from Examples 1C to 4C only have inadequate fracture toughnesses of <3.8 MPa·m$^{1/2}$. Therefore, to obtain a maximum toughness, it is necessary for both the free C content and the binder phase content to be below a critical limit value.

Owing to the low free C contents of $\leq$0.1% by weight, lapped and polished surfaces of the sintered bodies exhibited a dark green color.

Comparative Examples 5C to 12C

Examples 1 to 4 and 1C to 4C were repeated, except that the pressed bodies were not subjected to a decarburizing treatment in air prior to sintering, but rather only to a heat treatment for binder removal under an argon atmosphere.

The binder removal took place in accordance with the following temperature program:

20–650° C.: 20 hours

Holding at 650° C.: 5 hours.

Table 7 gives the C, C and N analyses of the powder mixtures from Comparative Examples 5C, 6C, 11C and 12C, together with those of the green bodies which have undergone binder removal. As is clear from a comparison of the corresponding analysis values, the binder removal on average results in oxygen and free C contents which are approx. 0.25% by weight higher, while the nitrogen contents remain constant. Following the binder removal, all the green bodies accordingly contain approx. 0.5% by weight free carbon, approximately half of which is derived from the SiC sintering powder and half from the pressing aids which are pyrolyzed during the binder removal. In view of the oxygen contents having increased by an average of 0.25%, it is possible to conclude that 0.5% by weight $SiO_2$ is formed as a result of slight partial oxidation of ultrafine SiC grain fractions during the binder removal (argon protective gas of industrial-grade purity).

TABLE 7

Comparison of analyses for sintering powders/green bodies (data in % by weight)

| Element % by weight | Example 5C | | Example 6C | | Example 11C | | Example 12C | |
| --- | --- | --- | --- | --- | --- | --- | --- | --- |
| | SP | BR | SP | BR | SP | BR | SP | BR |
| Free C | 0.27 | 0.52 | 0.27 | 0.50 | 0.26 | 0.55 | 0.26 | 0.45 |
| O | 0.60 | 0.91 | 0.98 | 1.00 | 0.92 | 1.30 | 2.10 | 2.30 |
| N | 0.36 | 0.33 | 0.18 | 0.16 | 1.40 | 1.30 | 0.72 | 0.70 |

SP = Sintering powder doped with sintering aids
BR = Green bodies which have undergone binder removal

TABLE 6

Sintered body properties

| Example No. | SD g/cm$^3$ | P % by volume | Relative density % TD | Binder phase content % by weight | Free C content % by weight | Resistivity ohm · cm | Fracture toughness MPa.m$^{1/2}$ |
| --- | --- | --- | --- | --- | --- | --- | --- |
| 1 | 3.18 | 0.3 | 99.7 | 1.6 | 0.07 | 1.8 · 10$^9$ | 4.0 |
| 2 | 3.19 | 0.3 | 99.7 | 2.0 | 0.10 | 1.8 · 10$^7$ | 4.2 |
| 3 | 3.23 | 0.1 | 99.9 | 2.8 | 0.08 | 1.5 · 10$^{11}$ | 4.3 |
| 4 | 3.23 | 0.2 | 99.8 | 3.5 | 0.08 | 2.3 · 10$^{11}$ | 4.5 |
| 1C | 3.23 | 0.2 | 99.8 | 4.2 | 0.08 | 1.0 · 10$^{10}$ | 3.7 |
| 2C | 3.24 | 0.2 | 99.8 | 4.8 | 0.07 | 1.1 · 10$^{11}$ | 3.8 |
| 3C | 3.24 | 0.3 | 99.7 | 5.3 | 0.08 | 7.9 · 10$^7$ | 3.8 |
| 4C | 3.25 | 0.3 | 99.7 | 6.0 | 0.09 | 1.8 · 10$^{11}$ | 3.8 |

SD = Sintered density, P = Porosity, % TD = % of theoretical density

The green bodies which had undergone binder removal were sintered under the same conditions as those given for Examples 1 to 4 and 1C to 4C. As can be seen from the data given in Table 8, the SiC bodies according to the invention were no longer obtained by gas-pressure sintering of SiC green bodies which underwent binder removal without oxidation annealing, i.e. with the additional use of adhering free carbon in quantities of over 0.1% by weight in the sintered body. Although the bodies are fully densified with binder phase contents beyond 2.5% by weight, their high free C content of greater than 0.1% by weight means that the fracture toughness and resistivity values are significantly worse than those of Examples 1 to 4.

TABLE 8

Sintered body properties

| Example No. | SD g/cm$^3$ | P % by volume | Relative density % TD | Binder phase content % by weight | Free C content % by weight | Resistivity ohm 1] cm | Fracture toughness MPa.m$^{1/2}$ |
|---|---|---|---|---|---|---|---|
| 5C | 2.73 | 13.6 | 86.4 | 1.4 | 0.31 | $1.2 \cdot 10^7$ | 2.8 |
| 6C | 2.91 | 8.7 | 91.3 | 1.6 | 0.15 | $4.8 \cdot 10^5$ | 3.1 |
| 7C | 3.21 | 0.2 | 99.8 | 2.5 | 0.28 | $7.8 \cdot 10^9$ | 3.3 |
| 8C | 3.24 | 0.1 | 99.9 | 3.1 | 0.20 | $3.2 \cdot 10^9$ | 3.5 |
| 9C | 3.22 | 0.2 | 99.8 | 4.0 | 0.40 | $5.0 \cdot 10^9$ | 3.6 |
| 10C | 3.24 | 0.2 | 99.8 | 4.5 | 0.30 | $3.0 \cdot 10^9$ | 3.5 |
| 11C | 3.22 | 0.5 | 99.5 | 5.2 | 0.49 | $1.0 \cdot 10^7$ | 3.6 |
| 12C | 3.25 | 0.3 | 99.7 | 5.8 | 0.23 | $3.4 \cdot 10^9$ | 3.5 |

SD = Sintered density, P = Porosity, % TD =% of theoretical density

The mirror-polished ground sections of specimens SC to 12C were black in color, which can be attributed to the presence of elemental carbon in quantities of 0.15–0.50% by weight as an accompanying phase. It is clearly apparent from the results given for Examples 5C and 6C that if only 1.5% by volume added sintering additive is used, the high carbon potential during sintering means that sufficient densification is no longer obtained, i.e. the sintering ceases at the open porosity stage, at densities of <92% TD. By contrast, using the method according to the invention (cf. Table 6, Examples 1 and 2), practically pore-free SiC shaped bodies with fracture toughnesses of $\geq 4.0$ MPa·m$^{1/2}$ are obtained even for minimized levels of binder phases (<2% by weight). Although the sintered bodies from Examples 7C to 12C do exhibit complete densification with binder phase contents of from 2.5 to 5.8% by weight, their fracture toughnesses are only $\leq 3.6$ MPa·m$^{1/2}$, and their resistivities are only in the range from $1 \times 10^7$ to $8 \times 10^9$ ohm·cm. Examples 11C and 12C characterize the known prior art (commercially available branded product EKasic T).

Table 9 below shows, for comparison purposes, the resistance to corrosion and oxidation of a test specimen according to the invention and two comparative test specimens.

TABLE 9

| Example No. | Resistance to corrosion (corrosion depth) | Resistance to oxidation (increase in weight) |
|---|---|---|
| 2 | 2 μm | 0.7 mg/cm$^2$ |
| 10C | 30 μm | 2.5 mg/cm$^2$ |
| 12C | 60 μm | 3.1 mg/cm$^2$ |

Conditions: Hydrothermal corrosion at 150° C., 70 hours, in 0.1 N HCl solution, oxidation at 1400° C., 100 hours, in air The values from Table 9 show that the shaped body according to the invention has a much higher resistance to corrosion and oxidation than the comparative test specimens.

Examples 5 and 6

Example 3 was repeated with the principal changes that the starting materials used were an alpha-SiC sintering powder with a specific surface area of 8.0 m$^2$/g, containing 0.21% by weight free carbon and 0.30% by weight residual oxygen, and the rare earth oxides Yb$_2$C$_3$ and Nd$_2$C$_3$ instead of Y$_2$O$_3$, the pressed bodies, prior to the sintering, underwent binder removal at 450° C. in flowing air (1 liter per min) and were decarburized down to free C contents of $\leq 0.1\%$ by weight in a single 6-hour heating step, and finally the final temperature selected for the gas-pressure sintering was 1980° C.

The results of these examples are compiled in Table 10. A ground section from the densified, virtually pore-free sintered bodies again exhibited a dark green color and, following plasma etching, an SIC microstructure with mean grain sizes of from 1.5 to 1.8 μm and a binder phase comprising aluminum grains and a grain boundary film, i.e., surrounding all the grains. The SiC grains exhibited a globular grain shape with a core-shell structure. By X-ray diffraction, the crystalline aluminates Yb$_4$Al$_2$O$_9$ and Yb$_3$Al$_5$O$_{12}$ (Example 5) and NdAlO$_3$ (Example 6) were detected as part of the binder phase.

TABLE 10

Sintering body properties

| Example No. | Added sintering additive % by weight | Relative density % TD | Binder phase content % by weight | Free C content % by weight | Resistivity ohm · cm | Fracture toughness MPa.m$^{1/2}$ |
|---|---|---|---|---|---|---|
| 5 | 2 Yb$_2$O$_3$-1 AlN | 99.7 | 3.0 | 0.04 | $1.0 \cdot 10^{12}$ | 4.5 |
| 6 | 1.5 Nd$_2$O$_3$-1.5 AlN | 99.8 | 2.5 | 0.07 | $5.2 \cdot 10^{11}$ | 4.3 |

As can be seen clearly from the results obtained for Examples 5 and 6, the SiC shaped bodies according to the invention are also obtained starting from other rare earth oxides and using a single preheating step for simultaneous binder removal and decarburization of the pressed bodies.

We claim:

1. A polycrystalline SiC shaped body comprising 96% by weight to 99.5% by weight of a hard-material phase; 0 to 0.1% by weight free carbon; remainder a partially crystalline binder phase; the hard-material phase comprising SiC and a Si—C—Al—O—N mixed crystal, containing 0.2 to 1.5% by weight dissolved aluminum, 0.1 to 0.5% by weight dissolved nitrogen, 0.01 to 0.2% by weight dissolved oxygen, the hard material phase comprising globular grains with a mean grain size of <4 μm, at least three grains enclosing a triple junction the globular grains having a structure comprising a core and a shell surrounding the core, the core comprising SiC and the shell comprising a Si—C—Al—O—N mixed crystal, the mixed crystal having an Al/N atomic ratio of 1.0:1.0 to 2.0:1.0, and the partially crystalline binder phase comprising crystalline and amorphous phases of the rare earth metal —Al—Si—O quaternary system, the amorphous phase being present in the form of a grain boundary film which surrounds the globular grains, and the crystalline phase being present in form of accumulations at the triple junctions comprising rare earth aluminate.

2. The SiC shaped body as claimed in claim 1, which has the following properties:

a density of at least 99.5% of a theoretically possible density;

a dark green coloring of ground sections or polished surfaces through characteristic light absorption in an orange spectral region between 1.8 and 2.2 eV;

a resistivity of at least $10^7$ ohm·cm; and a fracture toughness of at least 4.0 Mpa·m$^{1/2}$, measured using a bridge method.

3. A structural ceramic for gas sealing rings, comprising a polycrystalline SiC shaped body as claimed in claim 1.

4. A functional ceramic for hotplates or pan bases, comprising a polycrystalline SiC shaped body as claimed in claim 1.

5. A rolling-contact bearing component comprising a polycrystalline SiC shaped body as claimed in claim 1.

6. A substrate plate for recording arid reading heads, comprising a polycrystalline SiC shaped body as claimed in claim 1.

7. An armor plate to prevent the penetration of bullets, comprising a polycrystalline SiC shaped body as claimed in claim 1.

* * * * *